United States Patent
Liao et al.

(10) Patent No.: US 6,789,588 B2
(45) Date of Patent: Sep. 14, 2004

(54) WOOD PLANING MACHINE WITH A WOOD SHAVING COLLECTING MECHANISM

(76) Inventors: Juei-Seng Liao, No. 295, Sec. 1, Nanking E. Rd., Taichung City (TW); Pei-Lieh Chiang, No. 12, Nan-Ping Rd., Nan Dist., Taichung CIty (TW)

( * ) Notice: Subject to any disclaimer, the term of this patent is extended or adjusted under 35 U.S.C. 154(b) by 0 days.

(21) Appl. No.: 10/155,617

(22) Filed: May 24, 2002

(65) Prior Publication Data
US 2003/0188803 A1 Oct. 9, 2003

(30) Foreign Application Priority Data
Apr. 8, 2002 (TW) ........................ 91204494 U

(51) Int. Cl.⁷ .......................... B27G 21/00; B27G 19/00
(52) U.S. Cl. .................... 144/252.1; 15/312.2; 15/314; 83/100; 144/114.1; 144/117.1
(58) Field of Search ............................... 15/312.2, 314, 15/415.1; 83/100; 144/114.1, 117.1, 129, 130, 252.1; 451/435, 453, 456

(56) References Cited

U.S. PATENT DOCUMENTS

| | | | |
|---|---|---|---|
| 6,293,321 B1 * | 9/2001 | Chiang .................... | 144/252.1 |
| 6,382,278 B1 * | 5/2002 | Liao et al. ................ | 144/252.1 |
| 6,481,473 B2 * | 11/2002 | Liao et al. ................ | 144/252.1 |
| 6,481,474 B1 * | 11/2002 | Liao et al. ................ | 144/252.1 |
| 6,481,475 B1 * | 11/2002 | Liao et al. ................ | 144/252.1 |

OTHER PUBLICATIONS

U.S. Patent Application Ser. No. 29/160,506, "Wood Planning Machine"; Inventors: Juei–Seng Liao et al.; Filed May 13, 2002.

* cited by examiner

Primary Examiner—W. Donald Bray

(57) ABSTRACT

A wood planing machine includes a support carriage movably mounted on a mounting frame for supporting a cutting shaft. A motor housing and a shaving collecting member are mounted on the carriage. The collecting member defines a shaving passageway in the vicinity of the cutting shaft and in fluid communication with an air conduit such that an air stream introduced from the motor housing can entrain wood shavings collected in the collecting member. A blower mechanism includes a drive shaft coupled to and driven by the cutting shaft for rotating an impeller for drawing wood shavings from the collecting member into the blowing mechanism and out of a discharge member.

8 Claims, 6 Drawing Sheets

WOOD PLANING MACHINE WITH A WOOD SHAVING COLLECTING MECHANISM

CROSS-REFERENCE TO RELATED APPLICATION

This application claims priority of Taiwan patent Application No. 091204494, filed on Apr. 8, 2002.

BACKGROUND OF THE INVENTION

1. Field of the Invention

This invention relates to a wood planing machine, more particularly to a wood planing machine with a wood shaving collecting mechanism in which a drive shaft is coupled to and is driven by a motor thereof.

2. Description of the Related Art

U.S. patent application Ser. No. 10/102,369 now, U.S. Pat. No. 6,481,475 by the Applicants discloses a wood planing machine that includes a mounting frame, a support carriage mounted movably on the mounting frame for rotatably mounting a cutting shaft, a motor housing mounted on the carriage and having a motor disposed therein to drive rotation of the cutting shaft, a blower mounted on the support carriage and having an impeller driven by a drive shaft, a shaving collecting member disposed in the vicinity of the cutting shaft to collect wood shavings, and an air conduit interconnecting the motor housing and the shaving collecting member to introduce an air stream into the shaving collecting member. Although wood shavings can be collected upon planing, since a drive transmission mechanism, such as a pulley-and-belt mechanism, is required to transmit the rotating force of the cutting shaft to the drive shaft, the wood planing machine is bulky and complicated in construction and the transmitting effect is not satisfactory.

SUMMARY OF THE INVENTION

The object of the present invention is to provide a wood planing machine which can overcome the aforesaid problems of the prior art.

According to this invention, the wood planing machine comprises a mounting frame with upper and lower ends opposite to each other in an upright direction. A support carriage is mounted on the mounting frame and is movable between the upper and lower end in the upright direction. The support carriage has right and left sides opposite to each other in a longitudinal direction transverse to the upright direction, and front and rear sides opposite to each other in a transverse direction relative to the longitudinal and upright directions. A motor housing is mounted on the support carriage to receive a motor which has an output shaft. An air duct is disposed adjacent to the right side for passage of introduced air, and has a communicating port. A rotatable cutting shaft is mounted on the support carriage, and is driven by the output shaft to be rotatable about an axis extending in the longitudinal direction. The cutting shaft has a coupling end which extends leftwardly and outwardly of the left side. A shaving collecting member is disposed on the support carriage to define a shaving passageway for collecting wood shavings. The shaving passageway has an intake port in the vicinity of the cutting shaft, and an outlet port downstream of the intake port and adjacent to the left side. An air conduit defines a flow channel which is in fluid communication with the communicating port, which is disposed upstream of the outlet port of the shaving passageway, and which extends to permit an air stream to flow in the transverse direction. An air stream directing member is disposed on the support carriage to direct the air stream to move along a flow route which extends in the longitudinal direction and cross the shaving passageway, such that the air stream flowing along the flow route passes by the intake port to entrain wood shavings thereinto for onward movement to the outlet port. A blower casing is disposed leftwardly of the left side, and has proximate and distal walls which are spaced apart from each other in the longitudinal direction and which are respectively proximate to and distal from the left side to define an accommodation chamber. The proximate wall has an inlet port formed therethrough, communicated with, and disposed downstream of the outlet port. A tubular discharge member is disposed between the proximate and distal walls, is in fluid communication with the accommodation chamber, and extends in a direction radial to the longitudinal direction. A drive shaft extends along the axis, and has a first end which is rotatably mounted on the distal wall, and a second end which is disposed opposite to the first end and which extends through the inlet port to be coupled to and rotated with the coupling end of the cutting shaft. An impeller is received in the accommodation chamber, and is connected to and is driven by the first end of the drive shaft to rotate about the axis so as to draw the wood shavings from the shaving passageway into the accommodation chamber via the inlet port and out of the discharge member.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
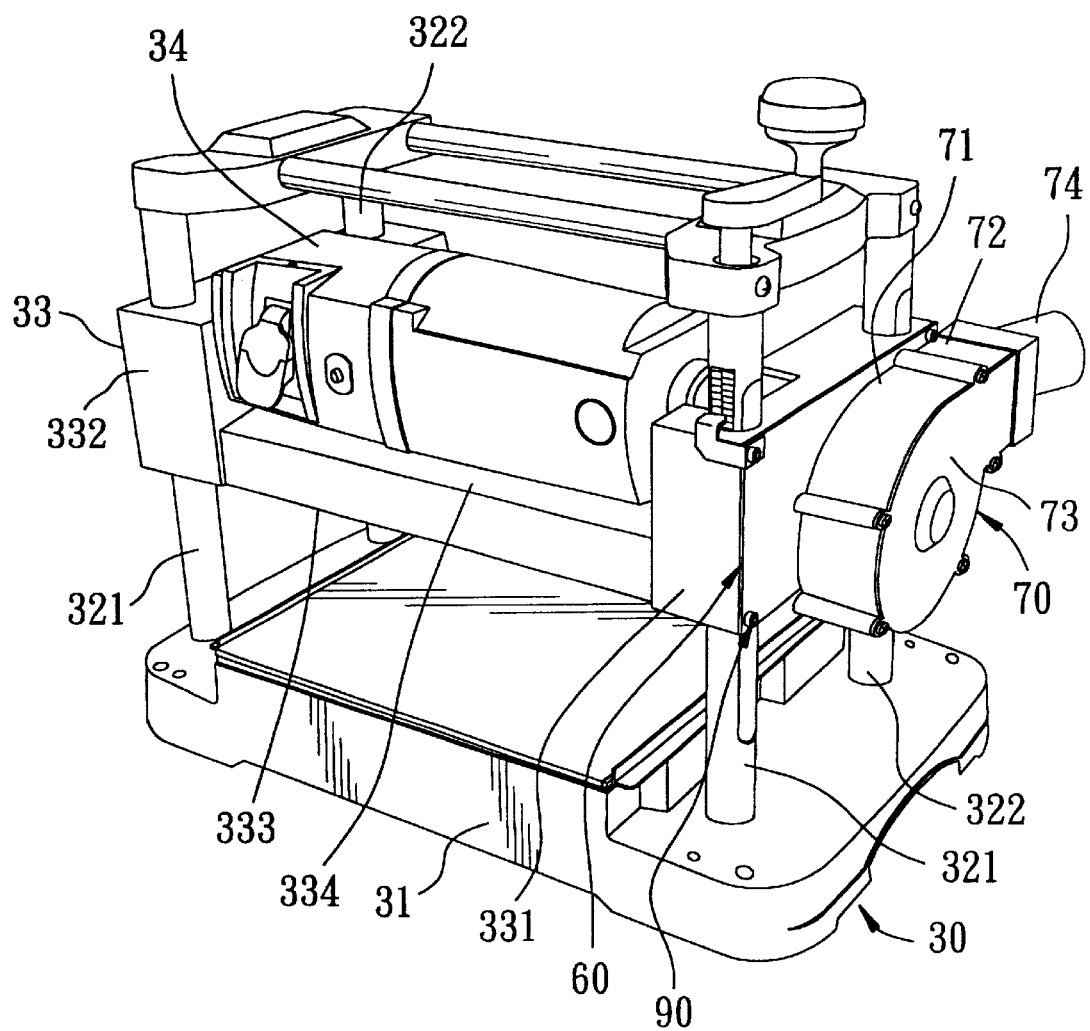
FIG. 1 is a perspective view of a preferred embodiment of a wood planing machine according to this invention.
Figure 2:
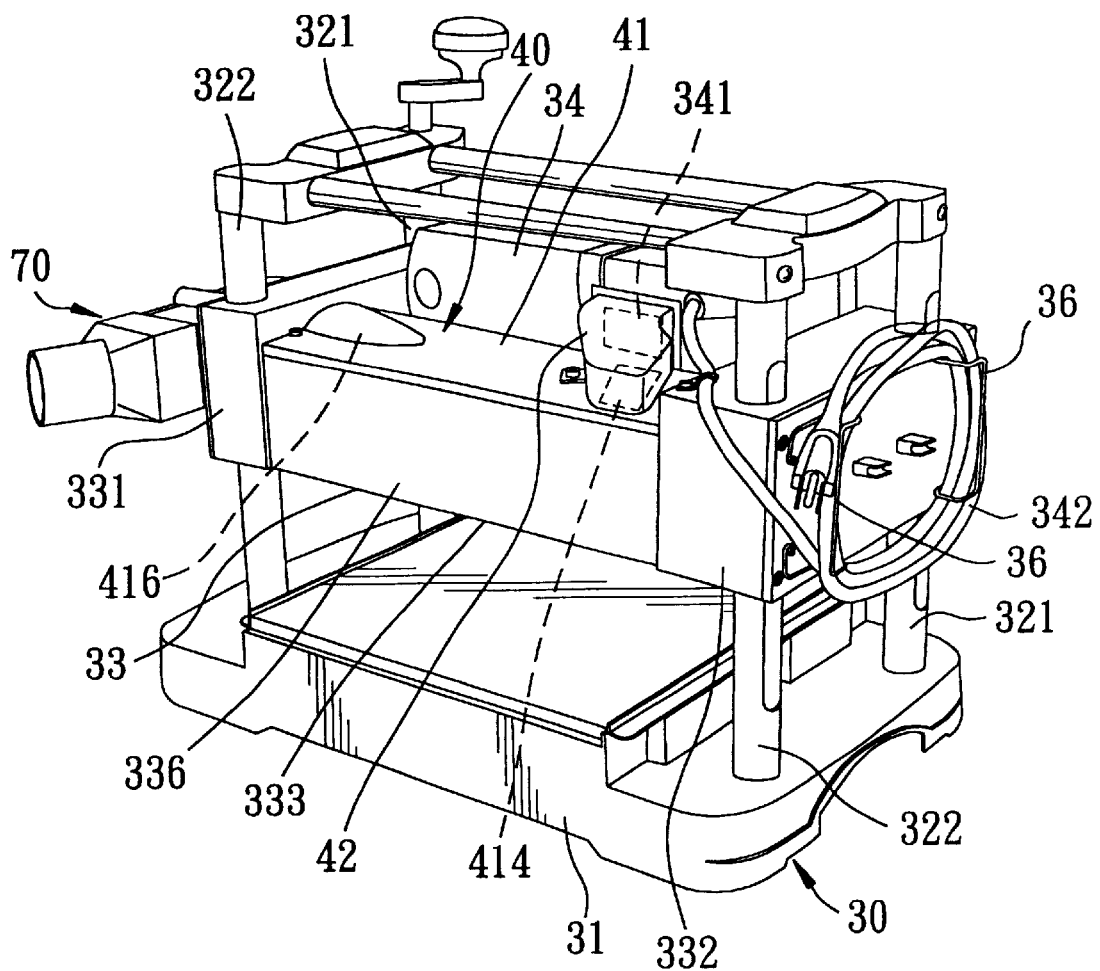
FIG. 2 is a perspective view of the preferred embodiment viewed from another side.

Referring to FIGS. 1 and 2, the preferred embodiment of the wood planing machine according to the present invention is shown to comprise a mounting frame 30 having upper and lower ends opposite to each other in an upright direction. The mounting frame 30 includes a base seat 31 at the lower end, and two front support rods 321 and two rear support rods 322 which extend in the upright direction from the base seat 31. The front support rods 321 are spaced apart from each other in a longitudinal direction transverse to the upright direction. The rear support rods 322 are spaced apart from each other in the longitudinal direction. Each front support rod 321 is spaced apart from the respective rear support rod 322 in a transverse direction relative to the upright and longitudinal direction.

Figure 3:
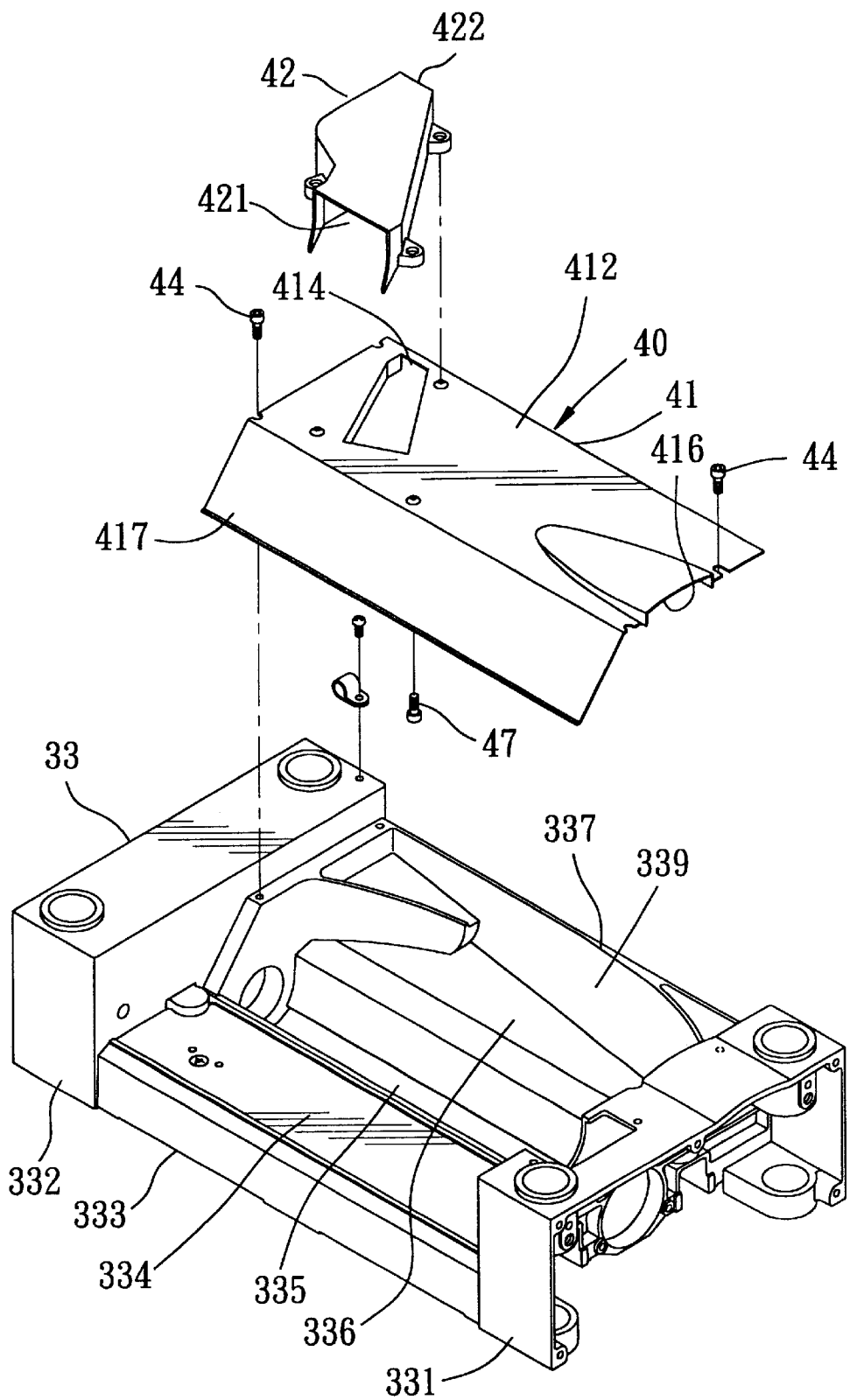
FIG. 3 is an exploded perspective view showing a support carriage, a shaving collecting member and an air conduit of the preferred embodiment.

With reference to FIG. 3, a support carriage 33 is mounted on the mounting frame 30, and includes left and right sides 331,332 for extension of the support rods 321,322 therethrough such that the support carriage 33 is movable in the upright direction. A support seat 333 is disposed between the left and right sides 331,332, and has front and rear sides 334,336 opposite to each other in the transverse direction, and a middle portion 335 therebetween. In addition, an air stream directing member 337 is disposed on and extends from the rear side 336 in the upright direction, and is formed with an inner arcuate surface 339 adjacent to the left side 331.

A motor housing 34 is mounted on the front side 334 of the support seat 333, and has a vent port 341 which is disposed adjacent to the right side 332. A motor (not shown) is disposed in the motor housing 34 and has an output shaft. An air duct (not shown) is formed in the motor housing 34 adjacent to the right side 332 for passage of introduced air, and has the vent port 341 as a communicating port for delivery of the introduced air.

Figure 6:
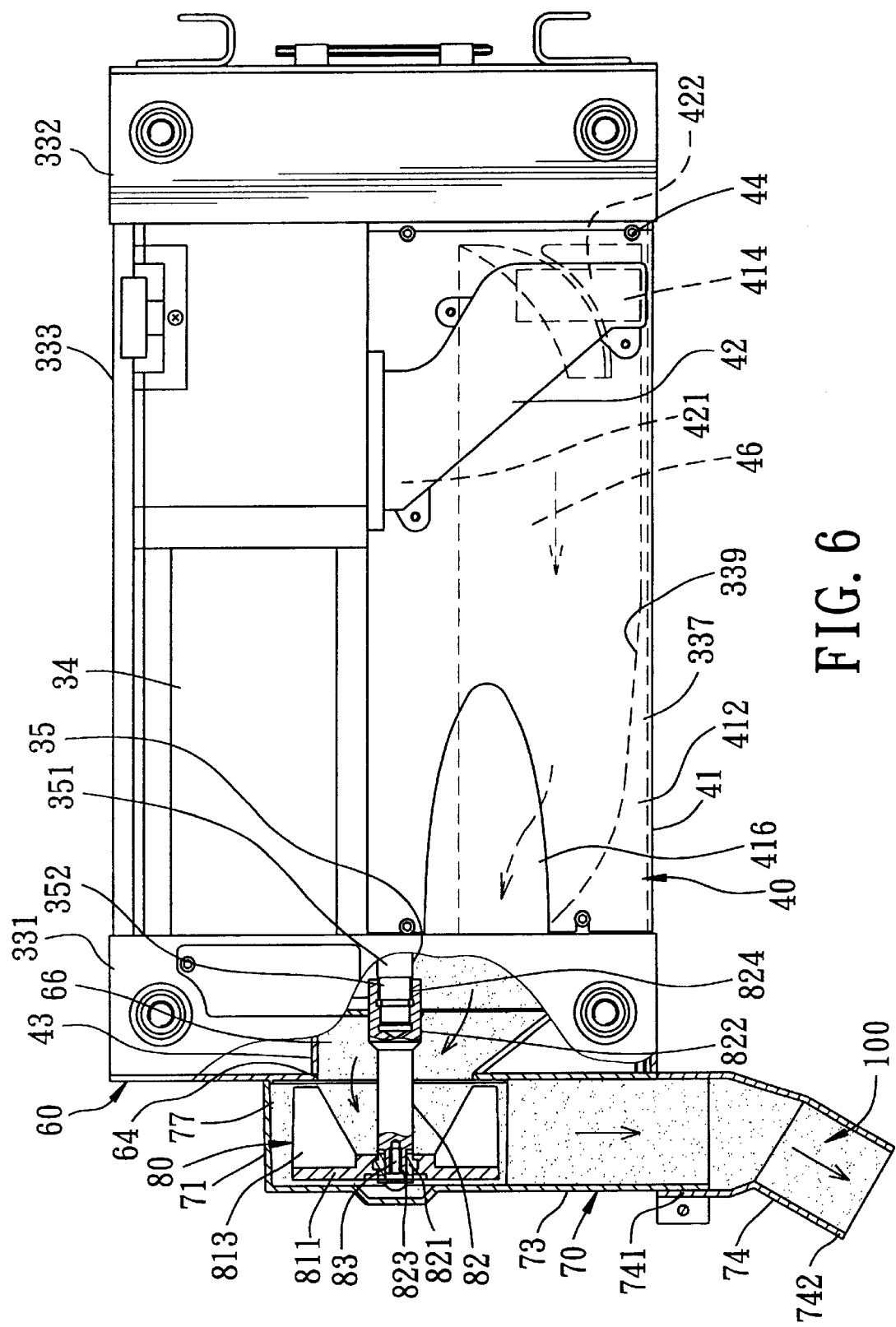
FIG. 6 is a fragmentary schematic view showing how the blowing mechanism is operated to draw wood shavings.

With reference to FIG. 6, a cutting member has a rotatable cutting shaft 35 which is mounted on the middle portion 335, and which is driven by the output shaft of the motor in a known manner to be rotatable about an axis extending in the longitudinal direction. The cutting shaft 35 has a coupling end 351 which extends leftwardly and outwardly of the left side 331 and which has an externally threaded portion 352.

A shaving collecting member 40 includes a collecting plate 41 which is secured on the left and right sides 331,332 by means of screws 44 and which covers the rear side 336 and the middle portion 335 to define a shaving passageway 46 for collecting wood shavings. The collecting plate 41 includes a front plate portion 417 (see FIG. 3) which is disposed over the cutting shaft 35 to define an intake port of the shaving passageway 46, and a rear plate portion 412 which extends in the transverse direction from the front plate portion 417 to the air stream directing member 337 to define the shaving passageway 46 and an outlet port 416 that is disposed downstream of the intake port and adjacent to the left side 331. A penetrating hole 414 is formed through the rear plate portion 412.

An air conduit 42 is mounted on the rear plate portion 412 by means of screws 47 to cover the penetrating hole 414, and defines a flow channel which has an end 421 that is connected to and that is in fluid communication with the vent port 341 in the motor housing 34, and an opposite end 422 that extends rearwardly from the end 421 and that is in fluid communication with the penetrating hole 414 to communicate the flow channel with the shaving passageway 46 so as to permit an air stream from the vent port 341 to flow in the transverse direction into the shaving passageway 46. Further, by virtue of the air stream directing member 337 and the inner arcuate surface 339, the air stream is directed to move along a flow route which extends in the longitudinal direction and cross the shaving passageway 46, such that the air stream passes by the intake port to entrain wood shavings thereinto for onward movement to the outlet port 416.

Figure 4:
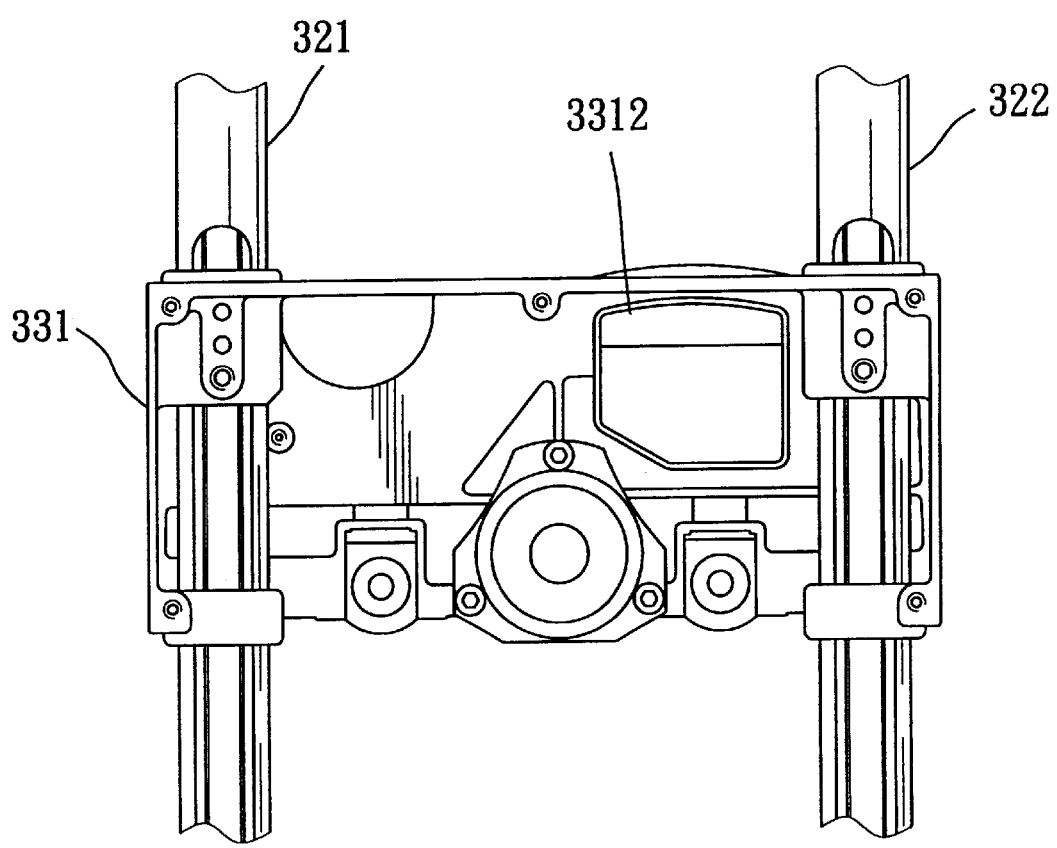
FIG. 4 is a side view showing a side of the support carriage.
Figure 5:
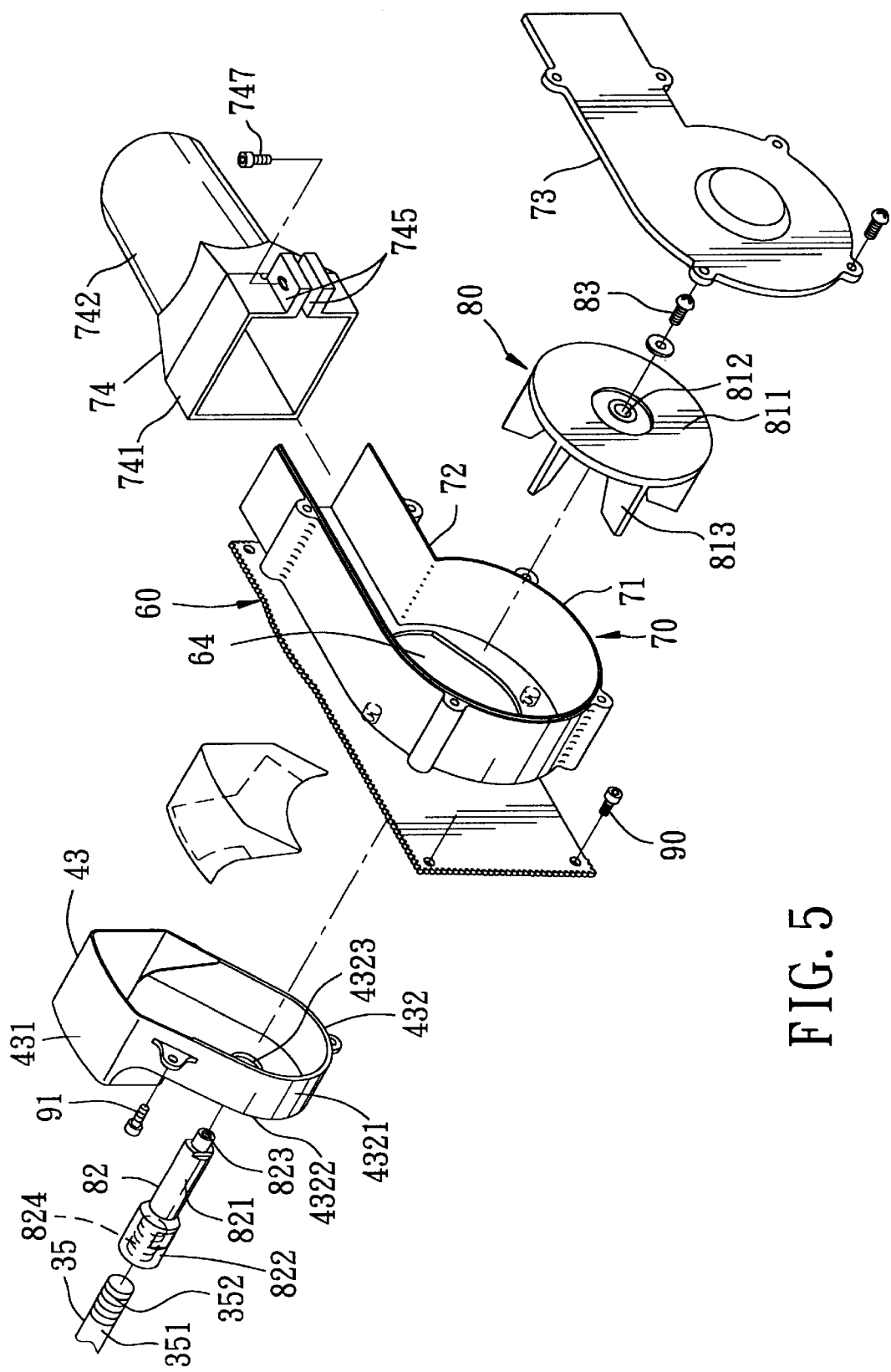
FIG. 5 is an exploded perspective view showing a blowing mechanism of the preferred embodiment.

With reference to FIGS. 4 and 5, the left side 331 has a mounting hole 3312 extending therethrough in the longitudinal direction. A shaving guiding member 43 includes a tubular coupling head 431 and a hollow cover 432 opposite to the coupling head 431 in the transverse direction to define a guiding passage 66 therein. The coupling head 431 is received in the mounting hole 3312, and has a first section of the guiding passage 66 communicating with and disposed downstream of the outlet port 416. The hollow cover 432 includes a surrounding wall 4321 and a face plate 4322 to define a second section of the guiding passage 66. The face plate 4322 is formed with a through hole 4323 confronting the second section.

A blowing mechanism includes a blower casing 70, a drive shaft 82, and an impeller 80. The blower casing 70 has proximate and distal walls 60,73 which are spaced apart from each other in the longitudinal direction and which are respectively proximate to and distal from the left side 331 and a surrounding wall 71 which is disposed between the proximate and distal walls 60,73 and which extends to terminate at two edges so as to define an accommodation chamber 77. The proximate wall 60 is secured on the left side 331 by means of screws 90, and is secured to the shaving guiding member 43 by means of screws 91. The proximate wall 60 has an inlet port 64 which is formed therethrough and which is communicated with and is disposed downstream of the second section of the guiding passage 66. A discharge tube 72 extends from the edges of the surrounding wall 71 in a direction radial to the longitudinal direction. A tubular discharge member 74 is coupled to the discharge tube 72 by a screw 747 which passes through two split lugs 745 disposed on a coupling portion 741 thereof. A discharge portion 742 extends from the coupling portion 741, and can be connected to a collecting bag (not shown).

The drive shaft 82 extends along the axis, and has a first end 821 which is rotatably mounted on the distal wall 73 and which is formed with a screw hole 823, and a second end 822 which is disposed opposite to the first end 821, which extends through the inlet port 64 and the through hole 4323 in the shaving guiding member 43, and which has an internally threaded portion 824 for engaging threadedly the externally threaded portion 352 of the coupling end 351 of the cutting shaft 35 so as to be coupled to and rotated with the cutting shaft 35.

The impeller 80 is received in the accommodation chamber 77, and includes a connecting plate 811 which is secured on the first end 821 of the drive shaft 82 by a screw 83 that passes through a hole 812 and that engages threadedly the screw hole 823 in the first end 821 so as to be driven by the drive shaft 82 to rotate a plurality of fins 813 on the connecting plate 811 about the axis.

With the construction as such, rotation of the motor results in air flow from the vent port 341 into the flow channel of the air conduit 42, and simultaneously causes rotation of the impeller 80 via the drive shaft 82, which, in turn, results in induction of air flow from the flow channel to the shaving passageway 46. The wood shavings 100 can be drawn from the shaving passageway 46 into the accommodation chamber 77 by virtue of the shaving guiding member 43 and can be discharged out of the discharge member 74.

Since the drive shaft 82 is coupled directly to the cutting shaft 35, rotating force of the cutting shaft 35 can be transmitted effectively to the drive shaft 82, and the transmitting mechanism can be eliminated, thereby resulting in a reduction in the number of components and the size of the wood planing machine.

Preferably, as shown in FIG. 2, two positioning members 36 are mounted on the right side 332 for winding an electric wire 342 of the motor.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A wood planing machine comprising:

a mounting frame having upper and lower ends opposite to each other in an upright direction;

a support carriage mounted on said mounting frame and movable between said upper and lower ends in the upright direction, said support carriage having right and left sides opposite to each other in a longitudinal direction transverse to the upright direction, and front and rear sides opposite to each other in a transverse direction relative to the longitudinal and upright directions;

a motor housing mounted on said support carriage;

a motor with an output shaft which is received in said motor housing;

an air duct disposed adjacent to said right side for passage of introduced air, and having a communicating port;

a rotatable cutting shaft mounted on said support carriage, driven by said output shaft to be rotatable about an axis extending in the longitudinal direction, and having a coupling end which extends leftwardly and outwardly of said left side;

a shaving collecting member disposed on said support carriage to define a shaving passageway for collecting wood shavings, said shaving passageway having an intake port which is disposed in the vicinity of said cutting shaft, and an outlet port which is disposed downstream of said intake port and adjacent to said left side;

an air conduit defining a flow channel which is in fluid communication with said communicating port, which is disposed upstream of said outlet port of said shaving passageway, and which extends in the transverse direction to permit an air stream to flow in the transverse direction;

an air stream directing member disposed on said support carriage to direct the air stream to move along a flow route which extends in the longitudinal direction and cross said shaving passageway, such that the air stream flowing along said flow route passes by said intake port so as to entrain wood shavings thereinto for onward movement to said outlet port;

a blower casing disposed leftwardly of said left side, and having proximate and distal walls which are spaced apart from each other in the longitudinal direction and which are respectively proximate to and distal from said left side to define an accommodation chamber, said proximate wall having an inlet port which is formed therethrough and which is communicated with and which is disposed downstream of said outlet port;

a tubular discharge member disposed between said proximate and distal walls, in fluid communication with said accommodation chamber, and extending in a direction radial to the longitudinal direction;

a drive shaft extending along the axis, and having a first end which is rotatably mounted on said distal wall, and a second end which is disposed opposite to said first end and which extends through said inlet port to be coupled to and rotated with said coupling end of said cutting shaft; and an impeller received in said accommodation chamber, and connected to and driven by said first end of said drive shaft to rotate about the axis so as to draw the wood shavings from said shaving passageway into said accommodation chamber via said inlet port and out of said discharge member.

2. The wood planing machine of claim 1, wherein said motor housing has a vent port which is disposed adjacent to said right side and which serves as said communicating port.

3. The wood planing machine of claim 2, wherein said shaving collecting member includes a front plate portion which is disposed over said cutting shaft to define said intake port, and a rear plate portion which extends in the transverse direction from said front plate portion to said air stream directing member to confine define said shaving passageway and said outlet port.

4. The wood planing machine of claim 3, wherein said rear plate portion has a penetrating hole formed therethrough, said penetrating hole being in fluid communication with and being disposed downstream of said flow channel of said air conduit to communicate said flow channel with said shaving passageway.

5. The wood planing machine of claim 1, wherein said left side has a mounting hole extending therethrough in the longitudinal direction, said wood planing machine further comprising a shaving guiding member confining defining a guiding passage which includes a first section that is disposed to communicate with said mounting hole and that is disposed downstream of said outlet port, and a second section that is opposite to said first section in the transverse direction, said shaving guiding member having a through hole which is disposed to confront said second section so as to permit said second end of said drive shaft to pass therethrough.

6. The wood planing machine of claim 1, wherein said second end of said drive shaft and said coupling end of said cutting shaft respectively have threaded portions extending along the axis and engaging threadedly each other.

7. The wood planing machine of claim 1, wherein said tubular discharge member is connected detachably to said blower casing.

8. The wood planing machine of claim 1, further comprising a positioning member which is mounted on said right side for winding an electric wire of said motor.

* * * * *